United States Patent [19]
Vidilles

[11] 3,922,862
[45] Dec. 2, 1975

[54] FLOATING CONTAINING VESSELS OR DAMS FOR TRAPPING LIQUID POLLUTANTS

[76] Inventor: Jacques Vidilles, 24 boulevard Maillot, 92000 Neuilly, France

[22] Filed: July 10, 1974

[21] Appl. No.: 487,288

[30] Foreign Application Priority Data
Aug. 16, 1973  France .............................. 73.29908

[52] U.S. Cl. ............................. 61/1 F; 210/DIG. 21
[51] Int. Cl.² .......................................... E02B 15/04
[58] Field of Search... 61/1 F; 210/83, 242, DIG. 21

[56] References Cited
UNITED STATES PATENTS

| | | | |
|---|---|---|---|
| 3,592,007 | 7/1971 | Renner .................................. | 61/1 F |
| 3,685,297 | 8/1972 | Juodis et al. ........................... | 61/1 F |
| 3,686,870 | 8/1972 | Blomberg ............................... | 61/1 F |
| 3,708,982 | 1/1973 | Blockwick .............................. | 61/1 F |

FOREIGN PATENTS OR APPLICATIONS

| | | | |
|---|---|---|---|
| 189,188 | 9/1959 | Denmark ..................... | 210/DIG. 21 |
| 1,528,855 | 6/1968 | France ......................... | 210/DIG. 21 |

Primary Examiner—Theodore A. Granger
Attorney, Agent, or Firm—Fitzpatrick, Cella, Harper & Scinto

[57] ABSTRACT

A floating containing vessel or dam for confining slicks of liquid pollutants. The vessel or dam comprises a flexible skirt connected at its upper portion to a float which provides buoyancy to the vessel, and at its lower portion to a ballast. The skirt forms an enclosure wherein the pollutants collect and the depth of the skirt varies from a maximum at the maximum interior position of the enclosure to a minimum at the towing ends of the vessel which define the entrance to the enclosure. The ballast is utilised as a towing means for towing the containing vessel or dam.

8 Claims, 10 Drawing Figures

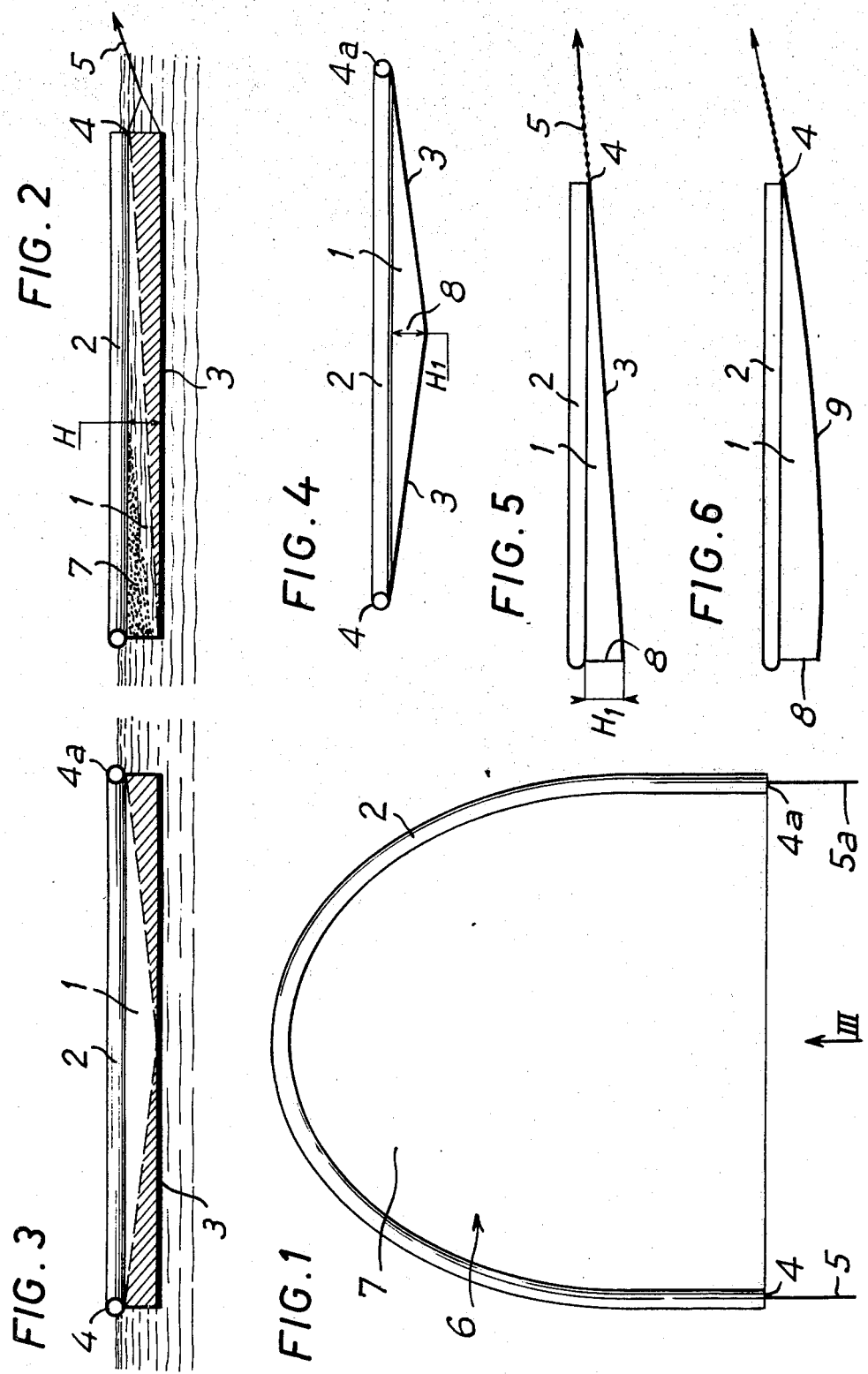

FLOATING CONTAINING VESSELS OR DAMS FOR TRAPPING LIQUID POLLUTANTS

The present invention relates to containing vessels for trapping slicks of liquid pollutants.

It is known to use floating vessels or dams for restricting the spread of slicks of liquid pollutants with a view to enabling the liquid to be recovered later under suitable conditions.

This type of equipment prevents the slick from spreading. Containing vessels or dams of this kind are, naturally, flexible in the horizontal plane, and they may be constructed of flexible or non-flexible material. As a general rule, these containing vessels or dams have a vertical wall of constant depth, which is referred to as the skirt, and whose draught varies according to the particular type of manufacture, although it will usually be between 0.30 m. and 1 m. The skirt is rendered buoyant by a single continuous float, or by a number of separate floats which may be constructed in various ways.

When there is a considerable current, appreciable difficulties are encountered with this type of containing vessel, these difficulties being such that it is not desirable to divert the containing vessel. Indeed, in instances where the containing vessel is moored, a relative movement will, naturally, take place between the containing vessel and the liquid on which it floats, this relative movement inevitably disturbing the flow. Furthermore, the containing vessel tends to retain a certain amount of water, the quantity of retaining water increasing as a function of increasing draught of the skirt of the containing vessel.

Furthermore, it has also been sought to tow a containing vessel or dam of this kind by its two ends, utilizing two ships which follow parallel paths of movement and which are so spaced from one another that, for a given length of the containing vessel, a pocket formed by the skirt is obtained. Naturally, the containing vessel is then given a parabolic shape which should, by creating a progressive decrease in the inlet cross-section, cause the polluting slick trapped in the "pocket" to become concentrated. However, it has to be pointed out first of all that this apparatus gives rise, from the point of view of flow dynamics, to the same phenomenon as in the above-described situation in which the containing vessel is stationary and the liquid, on which it floats, is in a state of movement.

The sole difference consists in the fact that, in the second instance, an appreciable amount of energy is consumed in the tugging or towing action. Indeed — and setting aside this difference — the containing vessel disturbs the flow, renders it turbulent, and vortices are created which cause both water and also the polluting slick to be washed into a position over the skirt.

Expressed in different terms, what it was desired to gain is, actually, lost, this phenomenon becoming progressively more acute in the downstream direction, considered in relation to the general direction of movement, that is to say with increasing concentration of the polluting substances.

In consequence of the above, a "funnel-like" configuration has been recommended which consists in breaking the continuity in the line of the containing vessel at the point at which the latter "attacks" the current perpendicularly, that is to say at the base of the "pocket." This procedure enables an outflow to be created, which tends to reduce the flow under the skirt but, for a significant outflow, the same problem is transferred in the downstream direction, which does not affect the economics of the system at all, including the containing vessel and recovery devices.

In the case of another proposed system, a recovery device is installed at the base or bottom of the pocket constituted by a towed containing vessel, this recovery device separating the polluting substances at great expense, and thrusting these polluting substances back into a floating storage container or storage boat, located inside the containing vessel or dam.

Each time the liquid is thus thrust back inside the containing vessel there is no outflow, which is tantamount to saying that an appreciable part of the work performed inside the system is lost by the turbulent flow (flow in the form of vortices) under the skirt.

Insofar as the skirts of the containing vessel are concerned — whether these skirts are flexible or rigid — a distinction has to be made between their real depth and their effective depth, the latter being linked to their behaviour, this being particularly true in the case of flexible skirts.

Indeed, if the amount of movement theoretically required for displacing the liquid, contained by the containing vessel is calculated — this amount of movement equalling the surface of the enclosure or space multiplied, firstly, by the depth of the skirt and, secondly, by the speed of the displacement — extremely high values result, these values being inversely proportional to the resistance to breakage of the containing vessel when being drawn, and to the power required for the tugs.

It has been observed that the skirt is lowered to some extent, and this action whereby the skirt moves aside frees a major part of the energy which would be necessary in accordance with the above-stated calculation. It is, then, appropriate to described as "the effective depth of the skirt" the real or actual depth of a skirt which is considered to be vertical and rigid and which would absorb the power actually utilised.

According to the present invention therefore a floating containing vessel is provided for confining slicks of liquid pollutants comprising a downwardly depending flexible skirt having an upper portion provided with a plurality of separate continuous float members to enable the vessel to float and a lower portion provided with a ballast said skirt defining a resilient pocket-shaped enclosure for collecting the liquid pollutants the ends of which form towing points of the vessel characterised in that the depth of the skirt is a maximum at a maximum interior position of the pocket-shaped enclosure whereat containment of the pollutants is initially constrained to concentrate, and decreases in depth from said position to a minimum depth at the ends of skirt, said ballast terminating in an upper portion of the containing vessel at the towing points thereof to form a non-extensible traction member which is connectable to a traction means for towing the containing vessel.

The invention will become more apparent from the following descriptive embodiments taken with reference to the accompanying drawings, in which:

FIG. 1 is a plan view of a floating containing vessel of known type;

FIG. 2 is a side elevation of a floating containing vessel of known type;

FIG. 3 is a front elevational view, as viewed in the direction of arrow III of FIG. 1;

FIG. 4 is a front elevational view, resembling that of FIG. 3, of a floating containing vessel according to the invention;

FIG. 5 is a side elevation of a containing vessel according to the invention;

FIG. 6 is a side elevation of a modified embodiment of the floating vessel;

Figure 7:
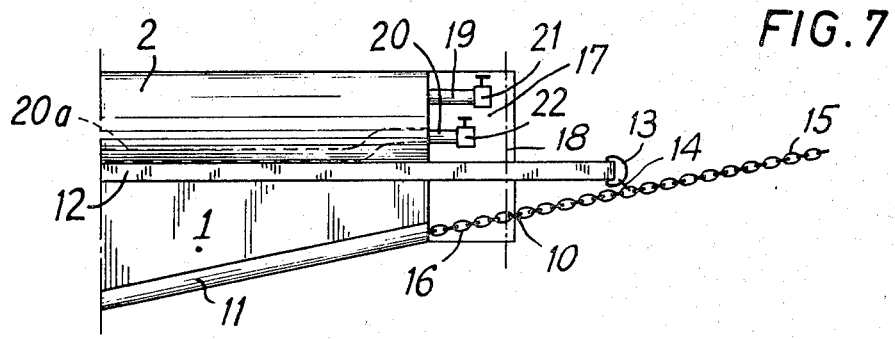
FIG. 7 is a detailed view illustrating one of the ends of the containing vessel.

Referring to FIGS. 1, 2 and 3 a containing vessel of a conventional type is illustrated, constituted by a skirt 1 having a constant depth H and having, in its upper region, a continuous float element 2, resembling the inner tube of a pneumatic tyre. The lower portion of the skirt 1 is equipped with a ballast 3, which normally comprises a chain. When the skirt 1 is towed by its ends 4, 4a by means of cables 5, 5a, which are connected to a traction means such as a ship it has, in a horizontal plane (FIG. 1), the shape of a pocket 6, inside which a liquid 7, constituting the polluting slick, accumulates.

In FIGS. 2 and 3 the hatched portion represents the portions of the skirt 1 which are considered to be of no value insofar as recovery of the polluting liquid 7 is concerned, this polluting liquid 7 floating on the surface of the water. Moreover, these hatched portions of the skirt 1 entrain a quantity of useless water, which tends to increase the work required to tug the containing vessel or dam.

For eliminating the drawbacks of conventional designs the present invention employs a floating containing vessel in which the hatched portion of the skirt 1 is absent.

FIGS. 4 and 5 illustrate a floating containing vessel or dam according to the invention, in which the depth $H_1$ of the skirt 1 is greatest at the base 8 of the pocket, and decreases to the ends 4, 4a of the skirt, the traction means 5, 5a being attached to the ends 4, 4a of the skirt. In the embodiment shown in FIGS. 4 and 5 the lower edge of the skirt is constituted by a straight line which interconnects the portion 8 of greatest depth and the ends 4, 4a of the skirt so that, in a sectional view, skirt 1 has a triangular shape.

According to another embodiment of the invention illustrated in FIG. 6, the surface of the skirt is delimited in its lower region by a curvilinear line 9, which interconnects portion 8 of maximum height $H_1$ and the portion of minimum height located at the ends.

According to one feature of the invention, the ballast 3, is, in particular, constituted by a chain 10 (FIG. 7), which is slidingly arranged in a guide 11, connected to the lower part of the skirt, the guide 11 being of a length which is compatible with that of the skirt 1.

The inclined position of the chain 10 which serves as a ballast and which follows the line of lower edge of the skirt, enables the chain to be employed in pulling the containing vessel by virtue of the fact that the chain terminates at the ends of the skirt and can be connected to a ship for ensuring that the containing vessel will be drawn along the surface of the water.

In the vicinity of the inflatable float member 2, the upper portion of the skirt is equipped with a strap 12, whose ends are provided with a ring 13 on which a hooking member 14 is mounted, the member 14 enabling the ends of the strap 12 to be attached to the traction chain 10.

By modifying the point at which the strap 12 is attached to the chain 10, it is possible to alter the inclination of the skirt 1, or to compensate for a decrease in the length of the skirt, after wear of the containing vessel, by correcting this inclination.

In instances where the hooking member 14 of the strap 12 is attached to a link such as link 15 of the chain, there is obtained a skirt which moves aside. Alternatively if the strap 12 is hooked to a link such as link 16 of the chain there is obtained a skirt which bails out.

An apparatus of this kind can therefore be used for carrying out its own optimisation tests.

Furthermore, it may be desirable to arrange matters such that the draught is never zero, even if this is only to allow the containing vessel to be used in stationary condition.

With this in view, the containing vessel is provided at its two ends, with a plate 17, which can be assembled in a tight-sealed condition to the plate located at the other end along a line 18.

Moreover, a containing vessel or dam of this kind may be constructed with a restricted number of elements, even from one such element. The same applies to the member imparting buoyancy to the vessel the overall assembly being preferably flexible.

At at least one of the ends of the containing vessel the latter is equipped with pipes 19 and 20, which comprise inflation cocks 21, 22.

Pipe 19 is used for inflating the continuous float member 2, which, mentioned above, somewhat resembles the inner tube of a pneumatic tyre. This continuous float member 2 is employed under normal service conditions whereas the pipe 20 is used for inflating an auxiliary bladder 20a, which is made from a tight-sealing foil. This auxiliary bladder is not inflated under normal service conditions, so that it cannot be accidentally perforated or pierced if the principal float member 2 should happen to be pierced or perforated. A single auxiliary bladder may suffice in the majority of cases, although it may be desirable to use any number of such auxiliary bladders.

Furthermore, the containing vessel according to the invention enables, by virtue of its particular shape, a greater length of containing vessel to be installed on an identical pulley, the displacement of the chain which takes place at each revolution being taken into account.

Figure 8:
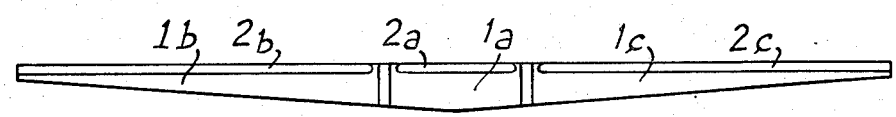
FIG. 8 is a sectional view of the containing vessel, constituted by several elements.

FIG. 8 illustrates in sectional view, a containing vessel which comprises a central element 1a, to which are attached side elements 1b 1c, which are initially in their separate or non-coupled condition.

Figure 9:
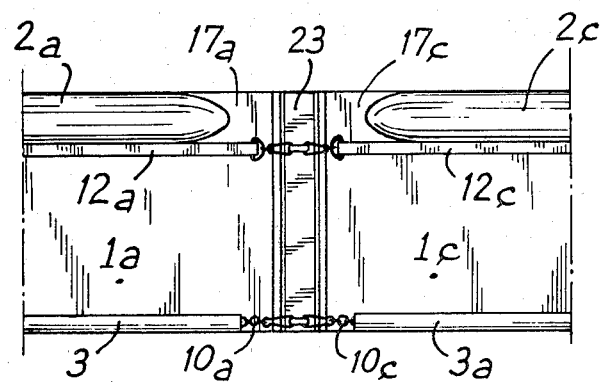
FIG. 9 is an elevational view of a joint interconnecting two elements.

FIG. 9 illustrates the way in which two elements 1a and 1c are attached together. It will be seen from this Figure that, by hooking together, at the joint 23, the strap elements 12a 12c and chain elements 10a 10c, the vertical distance, separating the strap 12 and the chain 10, is maintained practically unaltered. In this way, by means of a rigid connection, the depth of the skirt 1 is maintained, thus preventing the skirt 1 from assuming a "parachute" shape.

Figure 10:
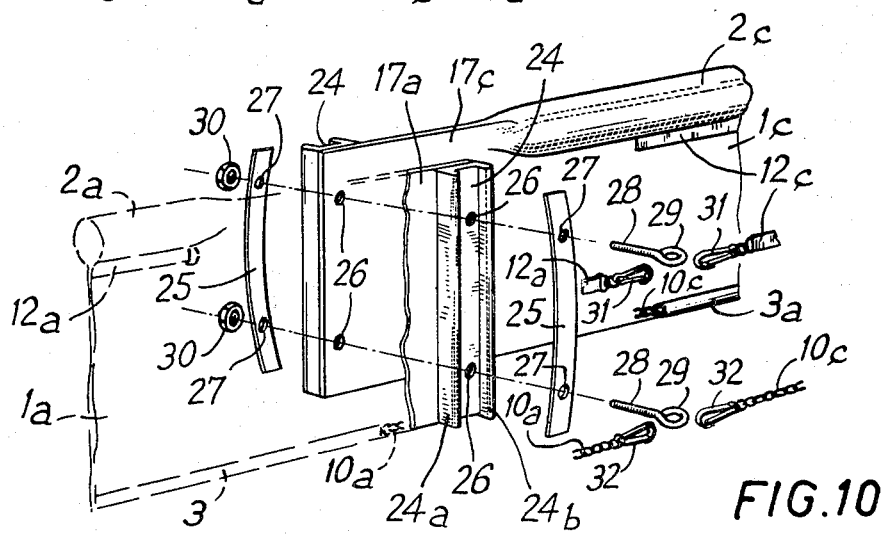
FIG. 10 is an exploded view of the members for interconnecting tow elements.

The connecting joint 23 which is illustrated in greater detail in FIG. 10 and is located at the ends of the plates 17a, 17c, comprises profiled elements 24 which are preferably extruded, and also comprises two shoulders 24a, 24b, between which a flexible curvilinear plate 25 is arranged, this flexible plate 25 assuming a position in which it abuts the profiled element 24.

The profiled element 24 and also plates 17a, 17c are provided with holes 26, while the flexible strips or plates 25 are formed with corresponding holes 27. Screws 28, whose heads are in the form of rings 29, engage the holes 26 of the profiled elements and the holes 27 of the flexible strips or plates 25, so as to attach the profiled elements 24 and the flexible strips or plates 25 together with the assistance of nuts 30, which are tightened onto the screw-threaded portion of the screws 28.

Any other attachment means can be utilised instead of the screws 28, in particular means equipped with pins or grooves, such as cotter pins when tightening the screws 28 by means of the nuts 30, the curvilinear flexible plates 25 are caused to deform, thereby ensuring the tight-sealed condition of the joint over the whole height of the plates 17.

The connecting joints having thus been formed, the ends of the strap elements 12a, 12c are attached to the ring 29 of upper screw 28 by means of snap-hooks 31, 31a, while the chain elements 10a, 10c, are attached to the ring 29 of the lower screw 28 by means of the snap-hooks 32. This arrangement imparts robustness and stability to the assembly, and enables force imparted to the strap and chain to be further transmitted.

Although the skirt 1 and inflatable float member 2 are preferably made of a flexible material, it will be apparent that these elements could also be made of a rigid material without departing from the ambit of the present invention.

The device and methods which have been described above, are solely by way of example, and may be modified in various ways by those versed in the art without thereby departing from the ambit of the invention. I claim:

1. Floating boom apparatus for collecting liquid floating on the surface of a body of water, said apparatus comprising elongate float means with an elongate strap member located along the length of said float means at the underside thereof, depending skirt means suspended from said float means, said skirt being constructed and arranged to be of substantially greater depth in the region between its ends than at each of its opposed ends, ballast means connected to the lower edge of the length of said skirt said ballast means comprising means extending beyond each end of said skirt for towing each end of said apparatus through said body of water, means connected to each end of said elongate strap member for adjustable connection of each end of said strap member to an adjacent portion of said towing member extending beyond each end of said float whereby said adjustable connection of each end of said strap to its adjacent towing member is effective to control the inclination of said downwardly depending skirt.

2. A floating boom as claimed in claim 1, wherein the lower portion of the downwardly depending skirt is delimited by a straight line interconnecting the portion of maximum depth thereof with the portions of minimum depth at the ends of said skirt.

3. A floating boom as claimed in claim 1, wherein the lower portion of the downwardly depending skirt is delimited by a curvilinear line which interconnects the portion of maximum depth thereof with the portions of minimum depth at respective ends of the skirt; the portions of maximum and minimum depth lying rearwardly and forwardly in respectively of the containing vessel.

4. A floating boom as claimed in claim 1, wherein the ballast means is a chain, which is slidably movable in a guide, rigidly connected to the lower portion of the skirt, said guide having a length substantially equal to that of the skirt.

5. A floating boom as claimed in claim 1, wherein said float means comprise a plurality of inflatable float members and wherein at least one auxiliary bladder is arranged in each of the inflatable float members, the auxiliary bladder having a separate inflation orifice than that of the float member in which it is arranged.

6. A floating boom as claimed in claim 5, wherein the skirt comprises a plurality of elements assembled together by connecting means.

7. A floating boom as claimed in claim 6, wherein said connecting means comprises two profiled elements, each of which has two shoulders and are fixed to the ends of two adjacent elements of the skirt, said profiled elements each receiving two flexible curved plates, and attachment members which engage at least two holes provided in each of the profiled elements and corresponding holes in the flexible plates to connect the two profiled elements with the flexible plates together said attachment members being also attached to the strap and to the ballast means.

8. A floating boom, as claimed in claim 7, wherein the attachment members are screws, which are provided with nuts, said attachment members each having a ringed portion to which the strap and ballast means are respectively attached by means of snap-hooks.

* * * * *